Dec. 10, 1940.  L. T. WHITE  2,224,494
PRESSURE RELIEF MEANS FOR AUTOMOBILES
Filed July 10, 1939
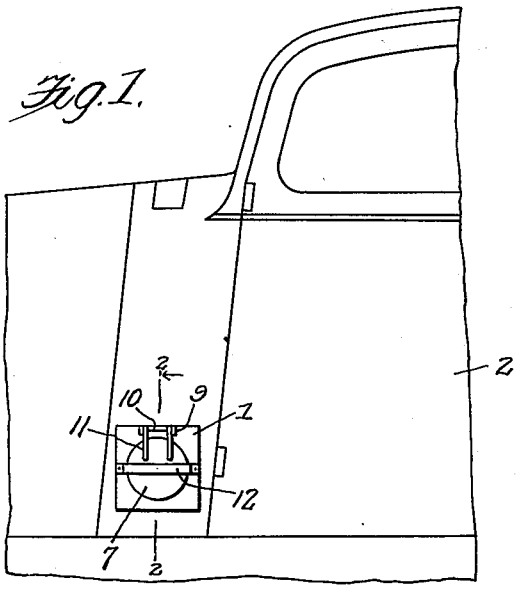
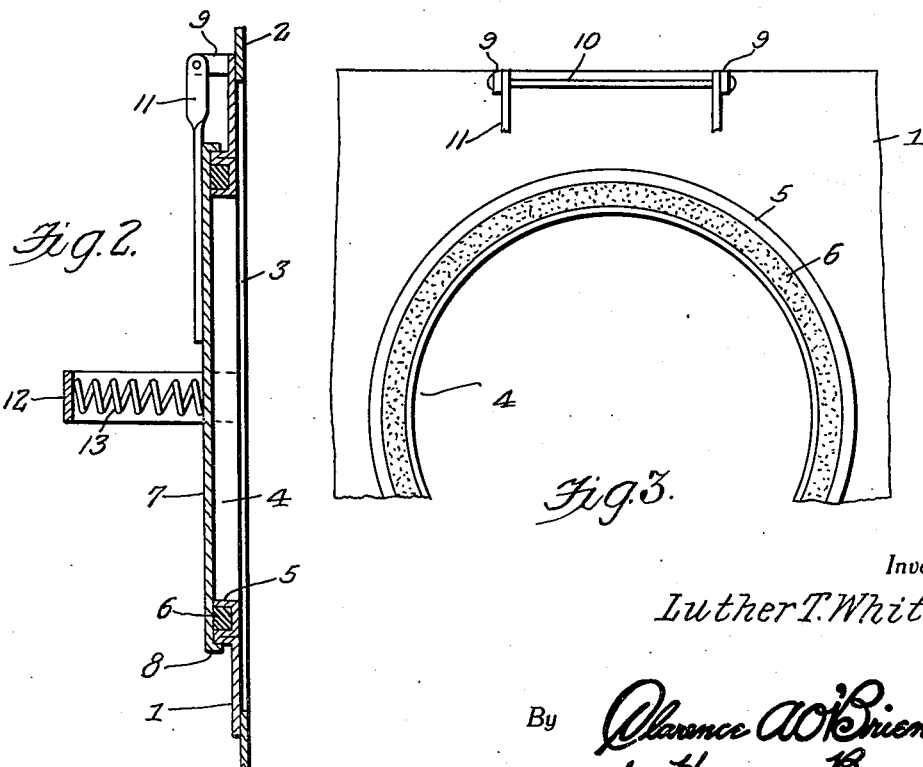
Inventor
*Luther T. White.*
By *Clarence A. O'Brien
and Hyman Berman*
Attorneys Patented Dec. 10, 1940

2,224,494

UNITED STATES PATENT OFFICE 2,224,494

PRESSURE RELIEF MEANS FOR AUTOMOBILES

Luther T. White, Troup, Tex.

Application July 10, 1939, Serial No. 283,690

1 Claim. (Cl. 137—53)

The present invention relates generally to new and useful improvements in closed automobile bodies and has for its primary object to provide, in a manner as hereinafter set forth, an outwardly opening check valve of a novel construction and arrangement for automatically releasing the air in the vehicle when the doors thereof are swung to closed position thereby preventing the occupants from being subjected to discomfort in addition to facilitating the closing and proper latching of the doors.

Other objects of the invention are to provide an automatic pressure relief means of the aforementioned character for closed vehicle bodies which will be comparatively simple in construction, strong, durable, highly efficient and reliable in use, inconspicuous and which may be manufactured at low cost.

All of the foregoing and still further objects and advantages of the invention will become apparent from a study of the following specification, taken in connection with the accompanying drawing wherein like characters of reference designate corresponding parts throughout the several views, and wherein:

Figure 1 is a view in side elevation, showing a pressure relief valve constructed in accordance with the present invention installed for operation on one side of an automobile body.

Figure 2 is a vertical sectional view, taken substantially on the line 2—2 of Fig. 1.

Figure 3 is an elevational view of a portion of the stationary plate and valve seat.

Referring now to the drawing in detail, it will be seen that the embodiment of the invention which has been illustrated comprises a metallic plate 1 which is secured in any suitable manner on the vehicle body 2 over an opening 3 therein. This is illustrated to advantage in Fig. 2 of the drawing. It may be well to here state that the device may be installed at any suitable location on the vehicle body.

As also shown to advantage in Fig. 2 of the drawing, the stationary plate 1 has formed therein a circular opening 4. The opening 4, of course, communicates with the opening 3. The inner marginal portion of the plate 1 is formed to provide a channel 5 around the opening 4, said channel constituting a valve seat and having mounted therein a resilient gasket or ring 6 of rubber or other suitable material.

The reference numeral 7 designates an outwardly opening check valve which is engageable with the seat 5. The check valve 7 includes a marginal flange 8 which is adapted to encircle the seat 5 when said check valve is in closed position. Projecting from the upper portion of the plate 1 is a pair of ears 9 between which a rod 10 extends. Straps 11 on the check valve 7 are journaled on the rod 10 for mounting said check valve for swinging movement on the plate 1.

Mounted horizontally on the stationary plate 1 is a substantially U-shaped bar or bracket 12 which traverses the opening 3. The check valve 7 is operable in the substantially U-shaped bracket 12. The reference numeral 13 designates a light coil spring having one end engaged with the bracket 12 and its other end engaged with the check valve 7 for yieldingly urging said check valve toward closed position.

It is thought that the manner in which the invention functions will be readily apparent from a consideration of the foregoing. Briefly, when the doors of the closed vehicle body 2 are swung to closed position, which ordinarily compresses the air in said body, the check valve 7 simply swings to open position against the tension of the coil spring 13 for permitting the escape to the atmosphere of the excess air. Thus, the occupants of the vehicle are prevented from being subjected to discomfort and the proper closing and latching of the door is facilitated. Of course, as soon as the excess air has escaped from the vehicle body the check valve 7 closes on the seat 5. In addition to preventing leakage, the resilient element 6 prevents noise when the valve 7 seats.

It is believed that the many advantages of an automatic pressure relief means for automobiles constructed in accordance with the present invention will be readily understood and although a preferred embodiment of the device is as illustrated and described, it is to be understood that changes in the details of construction and in the combination and arrangement of parts may be resorted to which will fall within the scope of the invention as claimed. For example, the plate 1 may be omitted, the channel or seat 5 formed in the vehicle body 2 around the opening 3 at the valve 7, the bar or bracket 12, etc., may be mounted directly on said body.

What is claimed is:

A pressure relief valve of the character described comprising a plate having a circular opening therein, ears projecting from the plate, a rod extending between said ears, the inner marginal portion of the plate comprising an annular channel member around the opening in said plate, said annular channel member constituting a valve seat having a resilient ring therein, an outwardly opening check valve engageable with the seat, said check valve comprising a marginal flange adapted to encircle the seat when said check valve is in closed position, straps on the check valve journalled on the rod for mounting said check valve on the plate for swinging movement, a substantially U-shaped bar mounted on the plate and traversing the opening, the check valve being operable in said bar, and a coil spring having one end engaged with the bar and its other end engaged with the valve for yieldingly urging said valve toward closed position.

LUTHER T. WHITE.